Patented Mar. 30, 1926.

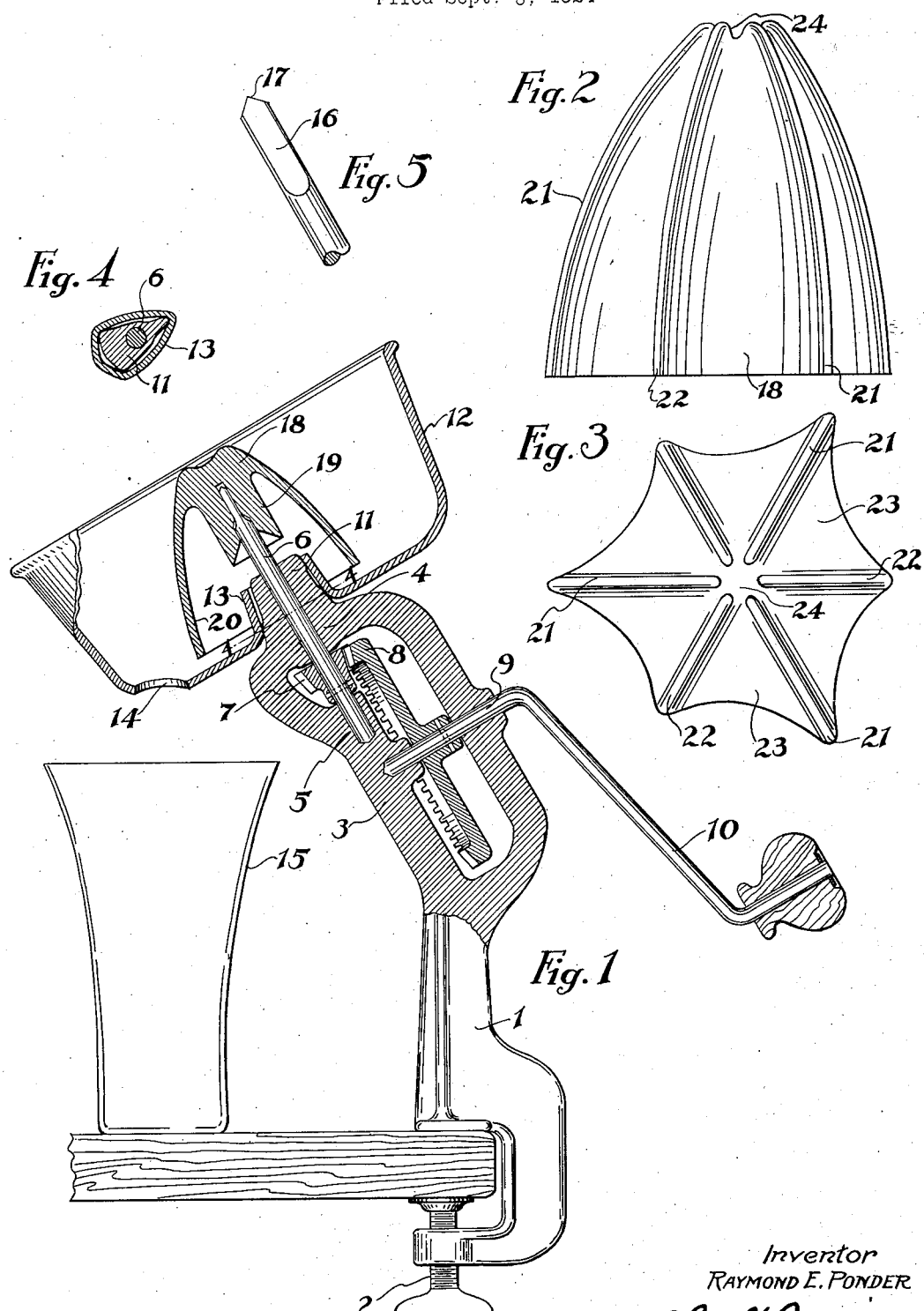

1,579,028

UNITED STATES PATENT OFFICE.

RAYMOND E. PONDER, OF ST. LOUIS, MISSOURI.

FRUIT JUICE AND PULP EXTRACTOR.

Application filed September 8, 1924. Serial No. 736,593.

*To all whom it may concern:*

Be it known that I, RAYMOND E. PONDER, a citizen of the United States, and residing at St. Louis, State of Missouri, have invented the new and useful Improvement in Fruit Juice and Pulp Extractors, of which the following is a specification.

This invention pertains to machines for extracting the juices and pulp from fruits and more particularly to machines intended for operation on citrous fruits.

The use of the juice of citrous fruits and particularly of oranges is becoming continually more widely spread. Orange juice is recommended as part of the diet of children and invalids and is considered a healthful and nourishing ingredient of various prepared dishes. Accordingly it is desirable to have at hand, particularly in hospitals and similar places where special foods are prepared, means for quickly and conveniently extracting the juices and pulp from oranges and similar fruits.

One of the objects of this invention, therefore, is to provide such a device which will not only be capable of quickly and conveniently extracting the juices and pulp, but which will perform this operation in such a way, that none of the undesirable matter such as the partition membranes of the fruit will be extracted along with the matter desired. A particular requirement of such a machine, particularly when used in hospitals and the like, is that it shall be easy to clean and keep in a sanitary condition.

Another object of this invention, therefore, is to provide such a machine which can be quickly disassembled as to its fruit handling parts so as to be easily and quickly cleaned between operations.

Another object is to provide such a machine which is mounted in a convenient position for handling, and for collecting the extracted material.

Further objects will appear from the following description taken in connection with the accompanying drawing, in which:

Figure 1 is a view in elevation, partly in section, of a device embodying this invention as mounted for use;

Figure 2 is a view in elevation of the extracting head;

Figure 3 is a plan view of Figure 2;

Figure 4 is a section on line 4—4 of Figure 1; and

Figure 5 is a detail of the spindle.

Referring now to the accompanying drawing 1 designates the frame which may be provided with a suitable clamping device 2 for mounting the same on a table. The upper part 3 of the frame is inclined to the vertical, and is provided with bearings 4 and 5 for a spindle 6 adapted to rotate in said bearings. The bearings 4 and 5 are arranged in accordance with the inclination of the part 3 of the frame so as to support the spindle 6 for rotation in a correspondingly inclined position. The spindle 6 has fixed thereto a beveled pinion 7 adapted for engagement with a beveled gear 8 fixed to the shank 9 of a crank 10. The shank 9 has bearings in the inclined portion 3 of the frame and substantially at right angles to the spindle 6. Accordingly the crank 10 will be constrained to move in an inclined orbit. It will be noted, however, that the inclination of this orbit as such is to render the operation of the crank more convenient than would be the case if the same moved in a vertical orbit. Operation of the crank 10 is, therefore, adapted to drive the spindle 6 in rotation through the agency of the gears 7 and 8.

The upper bearing 4 of the frame is provided with an upward extension 11 of a substantially triangular cross-section as shown in Figure 4. A pan 12, is provided to receive the juices and pulp extracted from the fruit. This pan is provided with an upwardly extending sleeve 13, adapted to fit over the extension 11 engaging the same at three points as shown in Figure 4. The extension 11 is tapered and the sleeve 13 is correspondingly tapered so that when the pan is set on the extension the same will settle to a firm seat so as to prevent all chance of vibration or shaking loose of the pan. In addition to this, the triangular form of the extension 11 and the sleeve 13 makes it necessary to set the pan 12 in place, always in the same position, thus rendering the same non-reversible. The pan 12 is thus mounted at an inclination so that the inclined bottom of the pan is steep enough to cause the extracted pulp to drain therefrom. The pan is provided at its lower portion with a suitable drain opening 14 from which the extracted pulp and juices may be drained to be caught in a suitable receptacle 15.

The end of the spindle 6 has a portion 16 thereof flattened as shown in Figure 5 while the tip 17 is provided with a conical form. This end of the spindle is thus formed for driving engagement with the extracting head 18 which is provided with a central socket 19 suitably formed to receive the same. The head 18 is arranged to be mounted on the end of the spindle 6 simply by slipping the socket 19 on the end of the spindle. When in position the skirt of the head extends downwardly to within a short distance of the bottom of pan 12.

The head 18 is generally dome shaped and is provided with a series of ridges adapted to engage the pulpy portion of the fruit in order to extract the juices and pulp therefrom. This head is provided with three main ridges 21 and three auxiliary ridges 22 alternating therewith. The main ridges 21 are of somewhat greater radial extent than the ridges 22 and are joined thereto by concave surfaces 23. All of the ridges have rounded edges and terminate at their upper portion or apex in a depression 24.

In using this machine the operator, after having cut the fruit in half, holds one of the halves in the hand and engages the same with the head 18 while the operator turns the crank 10 to rotate said head. The pulp and juices are extracted by the operation of the head 18 upon the fruit while the latter is held in the hand. The extracting head is specially formed for co-operation with the hand holding the fruit in order to extract the pulp and juices.

The extended ridges 21 have comparatively steeply sloping sides which engage the fruit, when the latter is pressed thereagainst, in an almost parallel relation. Accordingly the movement of these ridges against the fruit during rotation of the head is such as to have a pressing action on the pulp located between the rib and the rind of the fruit on the side toward which the movement takes place. This action is effective in pressing out the juices. The intermediate ribs 22 on the other hand are presented to the adjacent part of the fruit in a more nearly right angled relation with the rind so that these ridges will have more of a scraping action on the fruit. It will be noted that the three ridges 21 will have the effect of distending the rind so that the portion thereof between the ridges 21 will be more or less stretched. This is, as above described, a pressing relation. This extension of the rind across the ridges 21 at the same time brings the intermediate portions of the rind into substantially perpendicular relation with the ridges 22, which brings these ridges into scraping relation with the rind and at a reduced pressure.

As the ridges are rounded, however, there will be no tearing of the pulp or the partitions of the fruit. Accordingly the juice and pulp will be squeezed and rubbed out of the fruit without any tendency to tear or extract the partition membranes. It has been found in practice that a head of this shape will extract substantially all the pulp and juices without tearing or extracting any of the partition membranes.

As the material is removed from the fruit the same flows down the sides of the head 18 and is received in the pan. The inclined bottom of this pan causes not only the juices but also the pulp to flow downwardly therealong so as to be drained out at the drain 14. The upward extension of the sleeve 13 prevents any of the juices or pulp from getting in between this sleeve and the extension 11 or into the bearings of the spindle 6. It will be seen therefore, that this invention accomplishes its objects. A device is provided which on account of the inclined frame and the inclined orbit of the crank is mounted in a position convenient for operation. The inclined position of the pan 12 as well as that of the head 18 makes it very convenient for holding the fruit in engagement with said head. This inclined position insures the continuous and complete draining of the pulp, as well as the juices from the pan. The machine may thus be used continuously on a large quantity of fruit without the necessity of cleaning or clearing the machine when clogged. The simple mounting of the head and the pan make it possible to quickly disassemble the machine for thorough cleaning. The head and the pan being the only parts which are subject to soiling by the fruit may be removed bodily and thoroughly cleaned. The reassembly may then be carried out in an instant by simply slipping the part back in place.

It is obvious that various changes may be made in the details of construction without departing from the spirit of this invention; it is therefore to be understood that this invention is not to be limited to the specific details shown and described.

Having thus described the invention, what is claimed is:

1. A fruit juice and pulp extractor, comprising, a frame, a spindle mounted at a substantial inclination for rotation thereon, an extracting head on said spindle, means for rotating said spindle and a pan adapted to receive the extracted material and inclined substantially parallel with the inclination of said spindle so as to drain off the juices and pulp.

2. A fruit juice and pulp extractor, comprising a frame, a spindle mounted for rotation at a substantial angle between the horizontal and the vertical on said frame, an extracting head on said spindle and adapted for engagement with a fruit held in the hand, and an inclined pan arranged substantially parallel to said spindle adapted to receive the extracted material and having a drain at the lower part thereof.

3. A fruit juice and pulp extractor, comprising, a frame, a spindle mounted for rotation at a substantial angle between the horizontal and the vertical on said frame, an extracting head on said spindle and adapted for engagement with a fruit held in the hand, a receiving member on said frame, and a removable inclined pan adapted to rest on said member in one position only, said pan being adapted to receive and drain off the extracted pulp and juices.

4. A fruit juice and pulp extractor, comprising, an inclined frame, a spindle mounted for rotation at a substantial inclination on said frame, an extracting head on said spindle adapted for engagement with a fruit held in the hand, a pan arranged on said frame at an inclination substantially parallel to said spindle adapted to receive the extracted juice and pulp, and a crank for rotating said spindle adapted to move in an inclined orbit.

5. In a fruit juice and pulp extractor, a dome shaped extracting head provided with a series of six extracting ridges of varying extent and having rounded edges.

6. In a fruit juice and pulp extractor, a dome shaped extracting head provided with a series of six extracting ridges having rounded edges, three of said ridges having greater radial extent than the other three and alternating therewith.

7. In a fruit juice and pulp extractor, a dome-shaped extracting head provided with a series of extracting ridges having rounded edges, certain of said ridges being adapted for pressing engagement and certain others for scraping engagement with the fruit rind.

8. In a fruit juice and pulp extractor, a dome-shaped extracting head provided with a series of extracting ridges having rounded edges, certain of said ridges being adapted for pressing engagement and certain others for scraping engagement with the fruit rind, said pressing and scraping ridges alternating.

9. In a fruit juice and pulp extractor, a dome-shaped extracting head provided with three extracting ridges having rounded edges and projecting beyond the body of the head so as to provide a three-point bearing with portions of reduced lateral extent, said ridges being adapted for pressing engagement with the fruit rind.

10. In a fruit juice and pulp extractor, a dome-shaped extracting head provided with three extracting ridges having rounded edges and adapted for pressing engagement with the fruit rind and three alternate similar ridges adapted for scraping engagement with the fruit rind.

11. In a fruit juice and pulp extractor, a dome-shaped extracting head provided with a series of extracting ridges having rounded edges certain of said ridges extending beyond the others and being adapted to distend the fruit rind to bring the same into substantially perpendicular relation with the other ridges.

In testimony whereof I affix my signature this 5th day of September, 1924.

RAYMOND E. PONDER.